United States Patent
Jevons

(10) Patent No.: US 10,125,617 B2
(45) Date of Patent: Nov. 13, 2018

(54) COMPOSITE STRUCTURE AND A METHOD OF FABRICATING THE SAME

(71) Applicant: ROLLS-ROYCE PLC, London (GB)

(72) Inventor: Matthew Paul Jevons, Diedorf (DE)

(73) Assignee: ROLLS-ROYCE plc, London (GB)

( * ) Notice: Subject to any disclaimer, the term of this patent is extended or adjusted under 35 U.S.C. 154(b) by 537 days.

(21) Appl. No.: 14/718,598

(22) Filed: May 21, 2015

(65) Prior Publication Data

US 2015/0360451 A1  Dec. 17, 2015

(30) Foreign Application Priority Data

Jun. 11, 2014  (GB) .................................. 1410385.7

(51) Int. Cl.
| | |
|---|---|
| *B32B 27/12* | (2006.01) |
| *F01D 5/28* | (2006.01) |
| *B32B 27/40* | (2006.01) |
| *B32B 5/02* | (2006.01) |
| *B29C 70/02* | (2006.01) |

(Continued)

(52) U.S. Cl.
CPC .......... *F01D 5/282* (2013.01); *B29C 65/4835* (2013.01); *B29C 70/026* (2013.01); *B29C 70/086* (2013.01); *B32B 25/08* (2013.01); *B32B 25/14* (2013.01); *B32B 27/065* (2013.01); *B29K 2075/00* (2013.01); *B29L 2009/005* (2013.01); *B29L 2031/085* (2013.01);

(Continued)

(58) Field of Classification Search
None
See application file for complete search history.

(56) References Cited

U.S. PATENT DOCUMENTS

| | | |
|---|---|---|
| 5,368,914 A | 11/1994 | Barrett |
| 2012/0034833 A1 | 2/2012 | Schaube et al. |
| 2012/0207608 A1 | 8/2012 | Ebert et al. |

FOREIGN PATENT DOCUMENTS

| | | |
|---|---|---|
| DE | 10340561 A1 | 3/2004 |
| DE | 202009006966 U1 | 9/2010 |

(Continued)

OTHER PUBLICATIONS

Strong (Fundamentals of Composite in Manufacturing; Second Edition, 2008).*

(Continued)

*Primary Examiner* — Shawn Mckinnon
(74) *Attorney, Agent, or Firm* — Oliff PLC

(57) ABSTRACT

There is disclosed a method of fabricating a composite structure (6). The method comprises the steps of: providing a pair of preforms (1, 2), each comprising a plurality of reinforcing fibers (3); providing an intermediate layer (4) of resiliently deformable material between said preforms (1,2) to space said preforms apart from one another such that each preform (1,2) bears against a respective side (5) of the intermediate layer (4); providing a curable matrix material around said fibers (3); and curing said matrix material to form said plastic composite structure (6). Also disclosed is a composite structure (6) having at least two layers of fiber-reinforced plastic (1,2) which are bonded to respective sides (5) of an intermediate layer (4) of resiliently deformable material, the intermediate layer (4) being arranged to space the two layers of fiber-reinforced plastic (1,2) from one another.

13 Claims, 1 Drawing Sheet

(51) Int. Cl.
  *B29C 65/48* (2006.01)
  *B32B 25/08* (2006.01)
  *B32B 25/14* (2006.01)
  *B32B 27/06* (2006.01)
  *B29C 70/08* (2006.01)
  *B29L 9/00* (2006.01)
  *B29K 75/00* (2006.01)
  *B29L 31/08* (2006.01)

(52) U.S. Cl.
  CPC ..... *B32B 2262/106* (2013.01); *B32B 2603/00* (2013.01); *Y10T 442/3683* (2015.04)

(56) References Cited

FOREIGN PATENT DOCUMENTS

| EP | 0496550 A1 | 7/1992 |
| EP | 2037082 A1 | 3/2009 |
| WO | 2006/122749 A1 | 11/2006 |
| WO | 2013/045114 A2 | 4/2013 |

OTHER PUBLICATIONS

Nov. 9, 2015 Search Report issued in European Patent Application No. 15168634.

Dec. 9, 2014 Search Report issued in British Application No. GB1410385.7.

\* cited by examiner

COMPOSITE STRUCTURE AND A METHOD OF FABRICATING THE SAME

CROSS-REFERENCE TO RELATED APPLICATIONS

This application is based upon and claims the benefit of priority from British Patent Application Number 1410385.7 filed 11 Jun. 2014, the entire contents of which are incorporated by reference.

BACKGROUND

1. Field of the Disclosure

The present disclosure relates to a composite structure, and to a method of fabricating a composite structure.

2. Description of the Related Art

The present disclosure provides particular benefits in the field of composite aerofoils, and more particularly the field of composite fan blades for gas turbine engines. However, it is to be noted that in its broadest sense the disclosure is not limited to aerofoils or gas turbine fan blades, and can be used in connection with other types of composite structures also.

The use of composite materials for aerofoils in the form of fan blades for gas turbine engines, particularly those used for aircraft propulsion, is becoming increasingly attractive for engine manufacturers. Carbon-fibre-reinforced-plastic (CFRP) is of particular interest to engine designers in this regard. Advantages attributable to composite fan blades over more traditional titanium fan blades include lighter weight, improved efficiency, improved maintenance intervals, a reduction in noise and an improved performance characteristic in the event of ingestion of a foreign object such as a bird.

However, gas turbine fan blades are subject to an extremely small acceptable tolerance for dimensional variation, and it has been found that this can make it difficult and/or time-consuming and expensive to fabricate a composite fan blade which will be certain of satisfying the acceptable design tolerance on its thickness. It is sometimes the case that a composite fan blade must be scrapped if it cannot be made to satisfy the dimensional requirement of the blade design.

In order to ensure dimensional compliance with a fan blade design, it is common to machine composite preforms by removing material from their surfaces until the preform has an acceptable thickness. It has been found that the thickness of typical carbon-fibre plies used in the manufacture of CFRP fan blades can vary by approximately 4%, and this variation in ply thickness can affect the thickness of the manufactured component. To ensure compliance with design tolerances it is therefore known to machine the outer surfaces of the product after is has been moulded, in order to remove material and reduce its thickness to a size which falls within the design tolerance. This machining process can jeopardise the integrity of the component by reducing its strength through the removal of material, and can also induce undesirable stress in the product.

OBJECTS AND SUMMARY

It is an object of the present disclosure to provide an improved method of fabricating a composite structure. It is another object of the present disclosure to provide an improved composite structure.

According to a first aspect, there is provided a method of fabricating a composite structure (for example a plastic composite structure), the method comprising the steps of: providing a pair of preforms, each comprising a plurality of reinforcing fibres; providing an intermediate layer of resiliently deformable material between said preforms to space said preforms apart from one another such that each preform bears against a respective side of the intermediate layer; providing a curable matrix material around said fibres; and curing said matrix material to form said composite structure. The thickness of said intermediate layer is selected in dependence on the thickness of one or more of said preforms such that the composite structure fabricated via the method has a predetermined desired thickness.

The preforms may comprise an array of said fibres which are pre-impregnated with said curable matrix material prior to being spaced-apart by said intermediate layer.

Alternatively, the preforms may each be provided in the form of an array of dry fibres; wherein said step of providing the curable matrix around said fibres involves wetting said fibres with said matrix material in a liquid phase after said step of providing the intermediate layer between said preforms.

Optionally, said step of curing the matrix material is effective to bond said preforms to respective sides of said intermediate layer.

Optionally, the method may comprise providing at least two preforms. For example, two, three, four, five, six, seven, eight, nine, ten or more than 10 preforms may be provided. Optionally, more than one layer of resiliently deformable material may be provided. For example, a layer of resiliently deformable material may be provided between each pair of preforms.

Optionally, the thickness of said intermediate layer is selected in dependence on the thickness of the fibres in said preforms such that the composite structure fabricated via the method has a predetermined desired thickness.

Said fibres may be carbon fibres.

The method of the present disclosure may be used to fabricate a composite structure in the form of an aerofoil in which said intermediate layer lies in the region of the aerofoil's mean camber line or chord line. More particularly, the method may be used to fabricate a composite structure in the form of a fan blade for a gas turbine engine.

According to a second aspect, there is provided a composite structure (for example a plastic composite structure) having at least two layers of fibre-reinforced plastic which are bonded to respective sides of an intermediate layer of resiliently deformable material, the intermediate layer being arranged to space the two layers of fibre-reinforced plastic from one another. The thickness of the intermediate layer is selected in dependence on the thickness of one or more of the two layers such that the composite structure has a predetermined desired thickness.

The composite structure of the second aspect may be provided in the form of an aerofoil, wherein said intermediate layer lies in the region of the aerofoil's mean camber line or chord line, and may more particularly be provided in the form of a fan blade for a gas turbine engine.

Optionally, said layers of fibre-reinforced plastic are formed from carbon-fibre-reinforced plastic.

The resiliently deformable material may be a viscoelastic material.

Said resiliently deformable material may comprise polyurethane.

In particular embodiments, said intermediate layer may be formed of viscoelastic polyurethane rubber or foam.

BRIEF DESCRIPTION OF THE DRAWINGS

So that the disclosure may be more readily understood, and so that further features thereof may be appreciated, embodiments of the disclosure will now be described by way of example with reference to the accompanying drawings in which.

DETAILED DESCRIPTION OF EMBODIMENTS

Whilst specific reference is made herein to the fabrication of a composite structure in the form of a fan blade for a gas turbine engine, it is to be appreciated that the present disclosure is not intended to be limited to gas turbine fan blades and could alternatively be embodied in other types of composite products and methods for fabricating the same.

Figure 1:
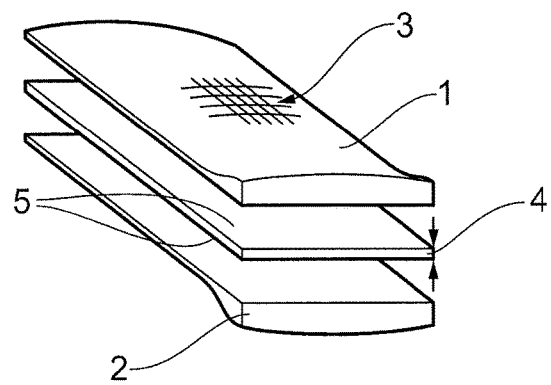
FIG. 1 is a schematic perspective view showing a pair of preforms and an intermediate layer of resiliently deformable material arranged in accordance with a step in the method of the present disclosure.

Embodiments of the present disclosure involve the provision of an intermediate layer between a pair of composite preforms. FIG. 1 illustrates schematically a pair of preforms 1, 2 of a type which may be used to form a composite structure in the form of a fan blade for a gas turbine engine. The preforms 1, 2 are each formed by laying up a plurality of reinforcing fibres (illustrated schematically at 3 in FIG. 1) such as, for example, carbon fibres. Each preform may be built up by a laying up process in which are a plurality of plies are laid on top of one another, each individual ply comprising an array of interwoven, parallel or crimped carbon fibres. The plies may be laid on top of one another at different angles in order to achieve the desired strength and performance characteristic for the structure to be formed.

As will be appreciated by those of skill in the art, the formation of a composite structure such as a fan blade from reinforcing fibres involves applying a matrix around the fibres. It is common to use a matrix of thermosetting epoxy resin which may be applied to the fibres whilst in its liquid phase and which is subsequently cured by the simultaneous application of heat and pressure to form chemically irreversible bonds between the resin and the reinforcing fibres.

The two preforms 1, 2 may thus each be provided in the form of so-called "pre-preg" preforms in which the layers of reinforcing fibres therein are pre-impregnated with a suitable matrix material, such as epoxy resin, in its liquid phase. For example, in the case that the preforms are built up from a plurality of plies during a lay-up process as described above, each ply may be pre-impregnated with the matrix material.

As illustrated if FIG. 1, an intermediate layer 4 having a pair of oppositely directed side surfaces 5 is arranged between the two preforms 1, 2. The resilient layer may be provided in the form of a sheet of resiliently deformable material such as an elastomeric rubber or foam. As will be explained in more detail below, particular technical advantages arise from the use of a viscoelastic material for the intermediate layer 4 such, for example, a viscoelastic polyurethane rubber. However, it is to be appreciated that other types of resiliently deformable material can be used for the intermediate layer 4 instead.

Figure 2:
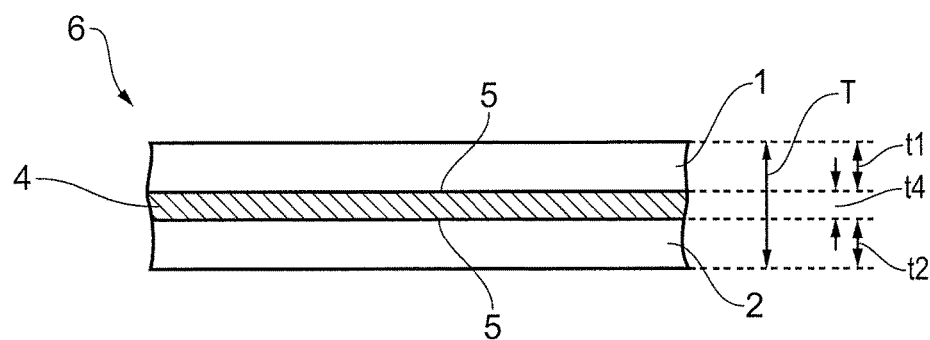
FIG. 2 is a schematic cross-sectional view through a composite structure in accordance with the present disclosure, and which includes the preforms and the intermediate layer shown in FIG. 1.

The two preforms 1, 2 are brought into contact with respective surfaces 5 of the intermediate layer 4 such that each preform 1, 2 bears against a respective side of the intermediate layer 4, with the intermediate layer 4 thereby spacing the preforms 1, 2 apart from one another as illustrated in the schematic cross-sectional view shown in FIG. 2. As will thus be appreciated, a so-called sandwich-type construction is formed in which the two preforms 1, 2 are separated by the resiliently deformable intermediate layer 4.

The matrix material surrounding the reinforcing fibres 3 may then be cured, for example via the simultaneous application of heat and pressure in order to form the composite structure 6. As it cures, the matrix material will not only form chemically irreversible bonds with the reinforcing fibres, but also with the surfaces 5 of the intermediate layer 4, forming respective layers of fibre reinforced plastic from each preform bonding the plastic layers to the reinforcing layer 4. However, it is to be appreciated that in variants of this embodiment it is envisaged that the preforms 1, 2 could be substantially fully cured prior to being arranged against the intermediate layer, in which case the preforms 1, 2 could be bonded to the resilient layer by the use of an additional adhesive.

In preferred embodiments of the method of the present disclosure, the thickness $t_4$ of the intermediate layer 4 and the thicknesses $t_1$, $t_2$ of the two preforms 1, 2 are carefully balanced to ensure that the resulting sandwich construction of the structure 6 will have an overall thickness T which is as close as possible to the design thickness of the product, thereby eliminating or at least significantly reducing the need to machine the product after fabrication in order to bring it back down to design dimensions. This can be achieved in a number of ways.

As mentioned above, variations in the thickness of the reinforcing fibres 3, and hence the plies which are formed from the fibres, affects the thickness of each preform 1, 2 which is formed from the fibres 3. It is therefore proposed that in some embodiments of the present method the thickness of the preforms 1, 2 will be measured and compared to the intended design thickness of the structure to be produced from them, so that then an appropriate thickness of resilient material can be selected for the intermediate layer 4. In this way, the thickness of the intermediate layer 4 is thus selected in dependence on the thickness of the preforms.

However, it may be somewhat inefficient and time consuming to have to measure the thickness of every pair of preforms 1, 2 during simultaneous or successive production of a plurality of composite structures 6 on a production line. It is therefore proposed that in some embodiments of the method, the thickness of the intermediate layer 4 can instead be selected in dependence on the thickness of the reinforcing fibres 3 themselves, and/or the individual plies which are formed from the fibres 3, rather than the actual measured thickness of individual preforms 1, 2.

In this regard, it is usually the case that the reinforcing fibres 3 or plies of the fibres 3 are supplied to a production facility in large batches. Whilst the thickness of fibres 3 and hence plies formed from the fibres 3 can vary (for example by up to 4% as mentioned previously) between individual batches, it has been found that there is generally little significant variation in fibre or ply thickness within any particular individual batch.

Furthermore, because the layup process used to form the fibre reinforced preforms is generally relatively consistent, it has been found that good results can be achieved by selecting an appropriate thickness for the intermediate layer 4 in dependence on the measured thickness of the fibres 3, or plies of the fibres 3, of each batch. It is possible to measure the thickness of the fibres 3 or plies for each batch, and from that measurement determine the resulting thickness of the preforms 1, 2 which will be formed from the fibres, and thus determine the appropriate thickness of the intermediate layer required to ensure that products 6 formed from that respective batch of fibres or plies has an acceptable overall thickness which will not require significant post-production machining to bring its thickness within acceptable tolerances.

As indicated above, some embodiments of the present disclosure involve the use of an intermediate layer 4 which is formed from viscoelastic material such as, for example, viscoelastic polyurethane rubber. As well as serving to space the two preforms 1, 2 apart from one another by an appropriate distance to ensure that the fabricated structure 6 has an acceptable overall shape and thickness, the use of viscoelastic material for the intermediate layer provides another useful advantage, which is particularly beneficial for structures in the form of fan blades for a gas turbine engine.

As will be appreciated by those of skill in the art, viscoelastic materials are characterised by exhibiting both viscous and elastic properties when subject to a deforming load. Viscoelastic materials thus exhibit time-dependent strain, with hysteresis displayed in the stress-strain curve for such materials. This characteristic means that a viscoelastic intermediate material 4 between the two preforms 1, 2 will provide a damping function.

This damping function helps to reduce the shear stress which would otherwise be applied to the surfaces of the fabricated structure 6 during any surface machining which might still be required to ensure proper surface finish to the structure. Furthermore, the damping function provided by the intermediate layer 4 between the two preforms can help to reduce vibration in the case of a gas turbine fan blade during operation of the engine and hence high speed rotation of the blade. Although the vibrations typically induced in composite fan blades are generally not as problematic as those arising in more conventional metal blades, this vibration reducing effect can still be very valuable.

Figure 3:
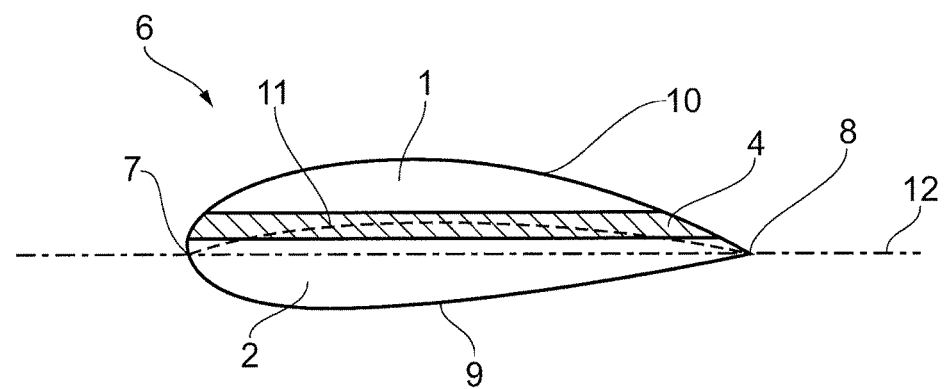
FIG. 3 is a schematic cross-sectional view taken through an aerofoil produced in accordance with the present disclosure.

FIG. 3 illustrates schematically a transverse cross section through a structure 6 provided in the form of a fan blade via the method described above. As will be appreciated, the fan blade has an aerofoil configuration having a leading edge 7, a trailing edge 8, a pressure surface 9 and a suction surface 10. In the arrangement illustrated in FIG. 3, the intermediate layer 4 extends generally along and in the region of the aerofoil section's mean camber line 11, between the position of the two preforms 1, 2. In alternative embodiments, however, it is envisaged that the intermediate layer 4 may be provided in the region of the aerofoil's chord line 12.

Whilst the disclosure has been described above with reference to specific embodiments, it is to be appreciated that various changes or modifications can be made without departing from the scope of the present disclosure.

For example, whilst the embodiments described above involve the use of preforms 1, 2 provided in the form of prepregs, and spacing them apart by the intermediate layer 4 prior to subsequent curing of the pre-impregnated resin, it is envisaged that in other embodiments the preforms 1, 2 could each be provided in the form of an array of dry reinforcing fibres 3 which would then be wetted by the application of the matrix material in its liquid phase after insertion of an intermediate layer 4 of appropriate thickness between the preforms.

Furthermore, whilst the disclosure has been described above with reference to embodiments using only two preforms 1, 2 which are separated by a single intermediate layer 4, the disclosure could also be embodied in the methods and structures formed from more than one pair of preforms 1, 2, with each pair being separated by a respective intermediate layer 4 in the manner otherwise described above. For example, such a structure could be formed in a multi-layer manner comprising alternating preforms and intermediate layers.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

I claim:

1. A method of fabricating a composite structure comprising:
   providing a pair of preforms, each including a plurality of reinforcing fibres;
   measuring a thickness of the plurality of reinforcing fibres within the pair of preforms to determine the thickness of the pair of preforms;
   providing an intermediate layer of resiliently deformable material between the preforms to space the preforms apart from one another such that each preform bears against a respective side of the intermediate layer;
   providing a curable matrix material around the plurality of reinforcing fibres; and
   curing the matrix material to form the composite structure, wherein:
   a thickness of the intermediate layer is selected in dependence on the measured thickness of the plurality of reinforcing fibres, such that the composite structure fabricated via the method has a predetermined desired thickness.

2. The method according to claim 1, wherein the plurality of reinforcing fibres of each of the pair of preforms are pre-impregnated with the curable matrix material prior to being spaced-apart by the intermediate layer.

3. The method according to claim 1, wherein the plurality of reinforcing fibres are dry fibres, and providing the curable matrix around the plurality of reinforcing fibres includes wetting the plurality of reinforcing fibres with the matrix material in a liquid phase after providing the intermediate layer between the pair of the preforms.

4. The method according to claim 1, wherein curing the matrix material bonds the preforms to respective sides of the intermediate layer.

5. The method according to claim 1, wherein the resiliently deformable material is a viscoelastic material.

6. The method according to claim 1, wherein the resiliently deformable material includes polyurethane.

7. The method according to claim 1, wherein the intermediate layer is formed of viscoelastic polyurethane rubber.

8. The method according to claim 1, wherein the fibres are carbon fibres.

9. The method according to claim 1, wherein the method is used to fabricate the composite structure in the form of an aerofoil in which the intermediate layer lies in a region of a mean camber line or chord line of the aerofoil.

10. The method according to according to claim 1, wherein the method is used to fabricate the composite structure in the form of a fan blade for a gas turbine engine.

11. A composite structure comprising:
- at least two layers of fibre-reinforced plastic which are bonded to respective sides of an intermediate layer of resiliently deformable material, the at least two layers of fibre-reinforced plastic being composed of a plurality of reinforcing fibres; and
- the intermediate layer being arranged to space the two layers of fibre-reinforced plastic from one another, a thickness of the intermediate layer being selected in dependence on either (i) a measured thickness of the plurality of reinforcing fibres, such that the composite structure has a predetermined desired thickness.

12. The composite structure according to claim 11, wherein the composite structure is provided in the form of a fan blade for a gas turbine engine.

13. A method of fabricating a composite structure comprising:
- providing a pair of preforms, each including a plurality of reinforcing fibres;
- providing an intermediate layer of resiliently deformable material between the preforms to space the preforms apart from one another such that each preform bears against a respective side of the intermediate layer;
- providing a curable matrix material around the plurality of reinforcing fibres; and
- curing the matrix material to form the composite structure, wherein:
- a thickness of the intermediate layer is determined based on a thickness of each of the plurality of reinforcing fibres.

* * * * *